(12) United States Patent
Li et al.

(10) Patent No.: US 11,530,629 B2
(45) Date of Patent: Dec. 20, 2022

(54) METHOD TO ATTACH COPPER ALLOY VALVE INSERTS TO ALUMINUM CYLINDER HEAD

(71) Applicant: GM Global Technology Operations LLC, Detroit, MI (US)

(72) Inventors: Huaxin Li, Rochester Hills, MI (US); Ronald J Petrus, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 165 days.

(21) Appl. No.: 16/913,636

(22) Filed: Jun. 26, 2020

(65) Prior Publication Data
US 2021/0404353 A1 Dec. 30, 2021

(51) Int. Cl.
| | |
|---|---|
| *F01L 3/06* | (2006.01) |
| *F02F 1/24* | (2006.01) |
| *C22C 9/01* | (2006.01) |
| *C22C 9/06* | (2006.01) |
| *F01L 3/02* | (2006.01) |
| *B23K 26/00* | (2014.01) |
| *B23K 26/244* | (2014.01) |
| *B23P 15/00* | (2006.01) |
| *B23K 103/10* | (2006.01) |

(52) U.S. Cl.
CPC ............ *F01L 3/06* (2013.01); *B23K 26/0093* (2013.01); *B23K 26/244* (2015.10); *B23P 15/001* (2013.01); *C22C 9/01* (2013.01); *C22C 9/06* (2013.01); *F01L 3/02* (2013.01); *F02F 1/24* (2013.01); *B23K 2103/10* (2018.08); *F02F 2200/00* (2013.01); *Y10T 29/49306* (2015.01)

(58) Field of Classification Search
CPC . F01L 3/06; F01L 3/02; B23K 26/244; B23K 26/0093; B23K 2103/10; C22C 9/01; C22C 9/06; B23P 15/001; F02F 1/24; F02F 2200/00; Y10T 29/49306
USPC .................. 29/888, 888.44, 888.01, 888.46; 123/188.8, 41.72; 219/121.64
See application file for complete search history.

(56) References Cited

U.S. PATENT DOCUMENTS

| | | | | |
|---|---|---|---|---|
| 4,378,332 | A * | 3/1983 | Chang ........................ | C22F 1/08 148/414 |
| 4,502,433 | A * | 3/1985 | Becker, Jr. ................. | F01L 3/22 123/188.8 |
| 5,492,091 | A * | 2/1996 | Russ .......................... | F01L 3/22 123/188.8 |
| 5,564,383 | A * | 10/1996 | Isaka ................ | F02M 35/10085 123/306 |
| 5,586,530 | A * | 12/1996 | Adachi ..................... | F01L 3/22 123/188.8 |
| 5,649,358 | A * | 7/1997 | Adachi ..................... | F01L 3/22 29/888.42 |
| 5,742,020 | A * | 4/1998 | Adachi ..................... | F01L 3/22 228/195 |

(Continued)

*Primary Examiner* — Jimmy Chou
(74) *Attorney, Agent, or Firm* — Vivacqua Crane PLLC

(57) ABSTRACT

A system to attach valve seat inserts to an aluminum cylinder head of an automobile vehicle includes a cylinder head of an automobile vehicle engine having a valve seat portion. A valve seat insert is positioned in the valve seat portion of the cylinder head. A fusion bond is created between the valve seat insert and the valve seat portion by laser welding thereby fusing the valve seat insert to the valve seat portion.

10 Claims, 3 Drawing Sheets

(56) References Cited

U.S. PATENT DOCUMENTS

| | | | | |
|---|---|---|---|---|
| 5,992,018 A * | 11/1999 | Reiter | ............... | B23P 15/001 239/585.4 |
| 6,138,351 A * | 10/2000 | Adachi | ............... | F01L 3/22 123/188.8 |
| 6,260,531 B1 * | 7/2001 | Haan | ............... | F01L 3/02 123/188.8 |
| 6,321,710 B1 * | 11/2001 | Hashimoto | ............... | F01L 3/04 123/188.8 |
| 6,397,464 B1 * | 6/2002 | Heigl | ............... | F01L 3/04 29/888.4 |
| 6,702,905 B1 * | 3/2004 | Qiao | ............... | C22C 38/54 148/543 |
| 6,904,668 B2 * | 6/2005 | Dallmeyer | ............... | F02M 51/0671 123/319 |
| 7,930,825 B2 * | 4/2011 | Fochtman | ............... | B23K 26/28 219/121.64 |
| 8,940,110 B2 * | 1/2015 | Qiao | ............... | C22C 33/0214 123/188.8 |
| 9,163,734 B2 * | 10/2015 | Mikami | ............... | F01L 3/04 |
| 10,035,221 B2 * | 7/2018 | Kadoya | ............... | B23K 33/006 |
| 10,287,933 B2 * | 5/2019 | Ikemi | ............... | F01L 3/18 |
| 10,767,520 B1 * | 9/2020 | Hattiangadi | ............... | F01L 3/06 |
| 10,787,939 B1 * | 9/2020 | Kipnis | ............... | B21K 1/22 |
| 10,871,124 B2 * | 12/2020 | Turner | ............... | B32B 15/016 |
| 10,934,902 B1 * | 3/2021 | Hattiangadi | ............... | F01P 3/14 |
| 11,125,123 B1 * | 9/2021 | Hattiangadi | ............... | F01L 3/22 |
| 11,300,018 B2 * | 4/2022 | Kunitake | ............... | F02F 1/24 |
| 2006/0153996 A1 * | 7/2006 | Stanek | ............... | B23K 26/32 118/712 |
| 2007/0220747 A1 * | 9/2007 | Akabane | ............... | F02M 61/168 29/888.4 |
| 2013/0313339 A1 * | 11/2013 | Carpenter | ............... | F02M 61/1833 239/548 |
| 2013/0333656 A1 * | 12/2013 | Endrigo | ............... | F02F 1/4264 123/188.8 |
| 2014/0305398 A1 * | 10/2014 | Gonsowski | ............... | F01L 3/20 123/193.5 |
| 2015/0101551 A1 * | 4/2015 | Kawasaki | ............... | F02F 1/108 219/121.64 |
| 2015/0152752 A1 * | 6/2015 | Qiao | ............... | C22C 30/00 123/188.8 |
| 2016/0076480 A1 * | 3/2016 | Endrigo | ............... | F01L 3/06 123/193.5 |
| 2016/0230696 A1 * | 8/2016 | Williams | ............... | B29C 43/003 |
| 2016/0311071 A1 * | 10/2016 | Dutta | ............... | C22C 21/00 |
| 2016/0356186 A1 * | 12/2016 | Tsuneishi | ............... | F01L 3/14 |
| 2016/0363041 A1 * | 12/2016 | Moffat | ............... | F02F 1/24 |
| 2017/0152768 A1 * | 6/2017 | Qu | ............... | F01L 3/06 |
| 2017/0175670 A1 * | 6/2017 | Nishimura | ............... | F02F 1/4235 |
| 2019/0277234 A1 * | 9/2019 | Rivera | ............... | F02D 41/2435 |
| 2019/0345892 A1 * | 11/2019 | Okimura | ............... | F01L 3/22 |
| 2020/0040840 A1 * | 2/2020 | Turner | ............... | C22C 21/02 |
| 2020/0291827 A1 * | 9/2020 | Hattiangadi | ............... | F01L 3/06 |
| 2020/0340593 A1 * | 10/2020 | Hattiangadi | ............... | F01L 3/22 |
| 2021/0180480 A1 * | 6/2021 | Krieger | ............... | F01L 3/02 |
| 2022/0145826 A1 * | 5/2022 | Stark | ............... | F02F 3/0015 |

\* cited by examiner

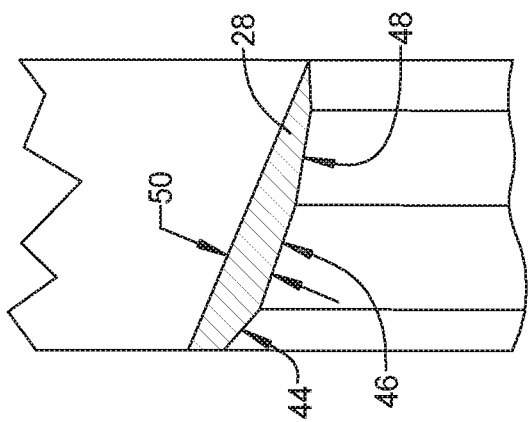
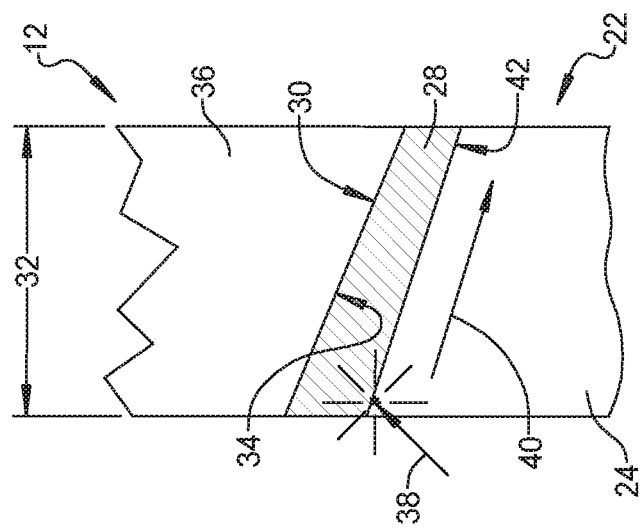
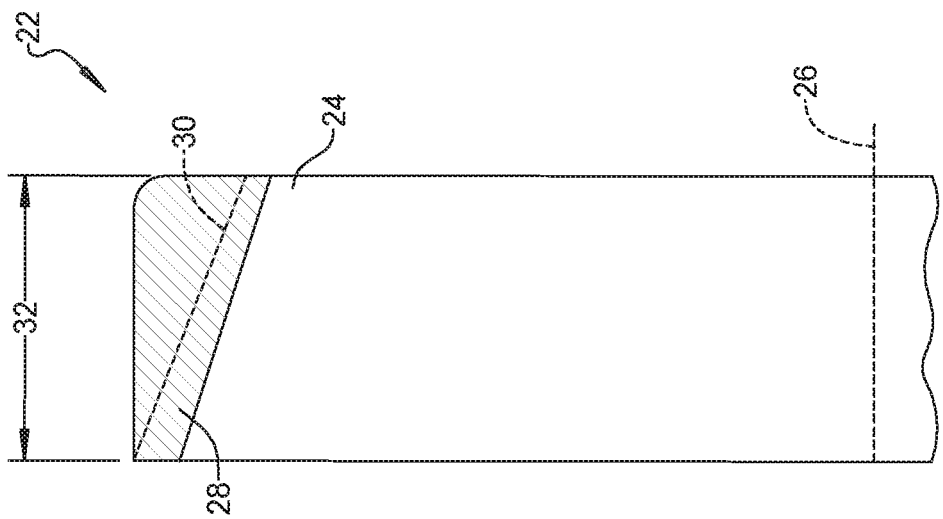

METHOD TO ATTACH COPPER ALLOY VALVE INSERTS TO ALUMINUM CYLINDER HEAD

INTRODUCTION

The present disclosure relates to automobile vehicle engine cylinder head inserts and methods to attach cylinder head inserts.

Automobile vehicle engines are commonly made with cast aluminum cylinder heads having valve seat inserts which receive reciprocating intake and exhaust valves. The inserts are commonly made of differing materials which provide enhanced wear resistance for moving parts. In some applications valve seat inserts are known which are manufactured from steel and installed using a press fit contact. Such inserts may be susceptible to contact surface gaps created between the valve seat inserts and the cylinder head and also to thermal distortion because the material of the steel valve seat insert and the aluminum cylinder head may not provide continuous metal-to-metal contact to facilitate heat transfer. High temperatures generated at the valve seat inserts and particularly at exhaust valve seat inserts may generate engine knock which is corrected by adjusting engine ignition timing, known to decrease engine performance.

Other known inserts are manufactured by applying a powder coating of a thermally conductive material such as copper or a copper alloy at a location of a valve seat insert and fusing the powder coating material to the aluminum cylinder head using a cladding process. This process may also be susceptible to contact surface gaps between the valve seat inserts in the fusion zone at the cylinder head due to incomplete weld fusion and also to thermal distortion resulting in engine knock because the material of the copper valve seat insert and the aluminum cylinder head may not provide continuous metal-to-metal contact to facilitate heat transfer.

Thus, while current cylinder head valve seat inserts and insert installation methods achieve their intended purpose, there is a need for a new and improved system and method for installing and fusing valve seat inserts in aluminum cylinder heads.

SUMMARY

According to several aspects, an engine component of an automobile vehicle includes a cylinder head of an automobile vehicle engine having a valve seat portion with a valve seat surface. A valve seat insert has an outer end including an insert surface and an inner surface oppositely facing with respect to the insert surface. A fusion bond defining a lap weld joint is created between the valve seat surface of the valve seat insert and the valve seat surface of the valve seat portion using a weld beam directed at the inner surface and penetrating the outer end from the inner surface to the insert surface, thereby fusing the valve seat insert to the valve seat portion.

In another aspect of the present disclosure, a body of the valve seat insert has an outer end machined to provide an insert surface for a total width of the body prior to creation of the fusion bond.

In another aspect of the present disclosure, the insert surface is positioned in direct contact with the valve seat surface.

In another aspect of the present disclosure, multiple surfaces including a valve seating surface, a valve stem clearance bore surface, and a relief surface are machined into the outer end.

In another aspect of the present disclosure, the valve seat portion defines an exhaust valve seat portion and further including an exhaust valve seat surface of the exhaust valve seat portion.

In another aspect of the present disclosure, the valve seat insert includes an insert surface coextensive with a total width of the exhaust valve seat surface.

In another aspect of the present disclosure, the fusion bond is created between the insert surface of the valve seat insert to the exhaust valve seat surface of the exhaust valve seat portion, thereby fusing the valve seat insert to the exhaust valve seat portion of the cylinder head.

In another aspect of the present disclosure, the valve seat insert defines a copper material.

In another aspect of the present disclosure, the valve seat insert defines a copper alloy having 70% to 85% copper, 10% to 20% aluminum, and 5% to 20% nickel.

In another aspect of the present disclosure, the valve seat insert is formed from a powdered metal having 60% to 84% copper, 5% to 25% nickel, 5% to 20% aluminum, 5% to 10% manganese, up to 0.35% Nb and 1% to 5% by volume $Al_2O_3$.

According to several aspects, a method to attach valve seat inserts to an aluminum cylinder head of an automobile vehicle using a lap weld joint includes: forming a valve seat portion with a valve seat surface into a cylinder head of an automobile vehicle engine; positioning a valve seat insert in the valve seat portion of the cylinder head, the valve seat insert having an outer end including an insert surface and an inner surface oppositely facing with respect to the insert surface; and applying a welding beam to the inner surface of the valve seat insert, the welding beam penetrating the outer end from the inner surface to the insert surface to create a fusion bond defining a lap weld joint between the valve seat insert and the valve seat portion, thereby fusing the valve seat insert to the valve seat portion.

In another aspect of the present disclosure, the method further includes machining an outer end of a body of the valve seat insert to create an insert surface for a total width of the body prior to performing the laser welding.

In another aspect of the present disclosure, the method further includes machining multiple surfaces including a valve seating surface, a valve stem entrance bore surface, and an entrance surface into the outer end after completion of the laser welding.

In another aspect of the present disclosure, the method further includes machining the outer end to provide a thickness of the outer end of greater than 0.5 mm after completion of the laser welding.

In another aspect of the present disclosure, the method further includes forming the valve seat insert from a copper alloy having 70% to 85% copper, 10% to 20% aluminum, and 5% to 20% nickel.

In another aspect of the present disclosure, the method further includes selecting a diode laser having a wavelength of approximately 450 nm to 1050 nm for the laser welding.

In another aspect of the present disclosure, the method further includes: providing the cylinder head as an aluminum cylinder head; creating a raised portion in the valve seat portion of the aluminum cylinder head; and locating the exhaust valve seat insert in a cavity of the raised portion during the positioning step.

According to several aspects, a method to attach valve seat inserts to an aluminum cylinder head of an automobile vehicle includes: forming an exhaust valve seat portion into an aluminum cylinder head of an automobile vehicle engine; producing an exhaust valve seat insert of a copper or a copper alloy material; positioning the exhaust valve seat insert in the exhaust valve seat portion of the aluminum cylinder head; performing a laser welding operation along an outer surface of the exhaust valve seat insert to create a fusion bond between the exhaust valve seat insert and the exhaust valve seat portion defining a lap weld joint, thereby fusing the exhaust valve seat insert to the exhaust valve seat portion of the cylinder head; and machining an outer end of the exhaust valve seat insert to provide a thickness of the outer end of approximately 1 mm after completion of the laser welding operation.

In another aspect of the present disclosure, the method further includes machining an outer end of a body of the exhaust valve seat insert to create an insert surface for a total width of the body prior to performing the laser welding operation.

In another aspect of the present disclosure, the method further includes machining the outer end to provide a thickness of the outer end of approximately 1 mm after completion of the laser welding operation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a partial cross-sectional view of a valve seat insert of the present disclosure prior to installation and machining;

FIG. 3 is a cross-sectional view taken at section 3 of FIG. 1 of an installed valve seat insert of the present disclosure;

FIG. 4 is a cross-sectional view of the valve seat insert of FIG. 3 following machining;

DETAILED DESCRIPTION

The following description is merely exemplary in nature and is not intended to limit the present disclosure, application, or uses.

Figure 1:
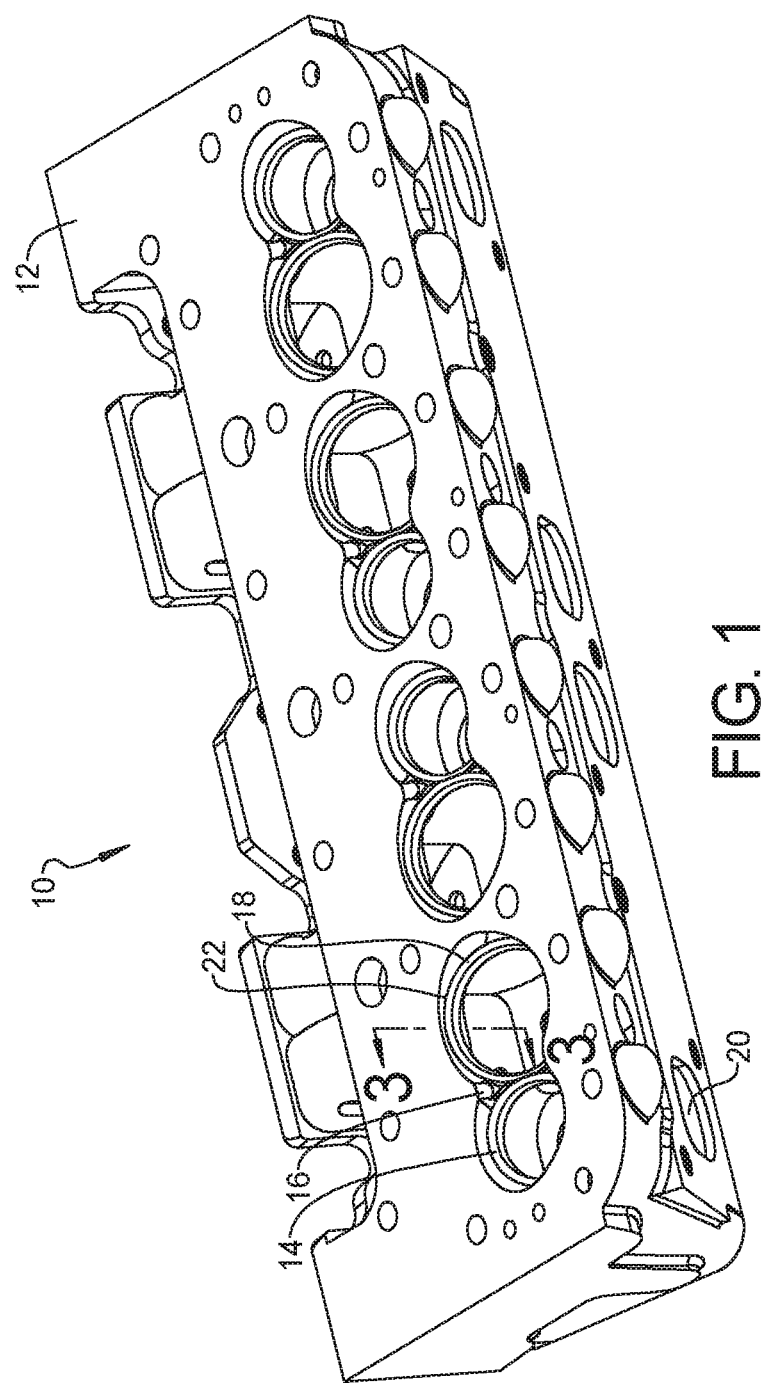
FIG. 1 is a cylinder head deck side perspective view of an aluminum cylinder head having a valve seat insert according to an exemplary aspect.

Referring to FIG. 1, a system and method to attach valve seat inserts to an aluminum cylinder head 10 provides an aluminum cylinder head 12 shown for example as a cylinder head of an 8-cylinder engine of an automobile vehicle. The cylinder head 12 includes multiple intake valve seats 14 for intake valves (not shown) which supply fuel and air into individual combustion chambers 16. The intake valve seats 14 are individually positioned proximate to one of multiple exhaust valve seats 18 which guide and seat exhaust valves (not shown) used to discharge combustion products from individual ones of the combustion chambers 16. An exhaust port 20 is provided for the combustion chambers 16 which directs exhaust gas to an exhaust header (not shown). The exhaust valve seats 18 are individually machined to final dimensions after initially fixing a valve seat insert 22 to the cylinder head 12 for example by welding as discussed below.

Referring to FIG. 2 and again to FIG. 1, the valve seat insert 22 includes a body 24 which is circular about a central axis 26. The valve seat insert 22 may be formed such as by machining or forging, is of a copper material such as but not limited to a pure copper, or a copper-nickel-aluminum alloy having for example 70% to 85% copper, 10% to 20% aluminum, and 5% to 20% nickel. The valve seat insert 22 may also be formed from a powdered metal having 60% to 84% copper, 5% to 25% nickel, 5% to 20% aluminum, 5% to 10% manganese, up to 0.35% Nb and 1% to 5% by volume $Al_2O_3$. An outer end 28 of the valve seat insert 22 is machined to provide an angled, flat insert surface 30 (shown prior to machining in FIG. 2) for a total width 32 of the body 24.

Referring to FIG. 3 and again to FIG. 2, the valve seat insert 22 is positioned having the insert surface 30 abutting an exhaust valve seat surface 34 of an exhaust valve seat portion 36 of the cylinder head 12 oriented complementary to the insert surface 30, the exhaust valve seat surface 34 coextensive with the total width 32 of the body 24. A weld beam 38 which may define a lap weld generated such as by a diode laser such as a blue diode laser having a wavelength of approximately 450 nm to 1050 nm is displaced in a weld direction 40 along an inner surface 42 of the outer end 28. The inner surface 42 is oppositely facing with respect to the insert surface 30. The weld beam 38 is predetermined in intensity and power to pass through the inner surface 42 and to fully penetrate the outer end 28 and to fuse an interface of the materials of the insert surface 30 of the valve seat insert 22 and the exhaust valve seat surface 34 of the exhaust valve seat portion 36, thereby fusing the valve seat insert 22 to the exhaust valve seat portion 36. A fusion bond shown and described in greater detail in reference to FIG. 6 defining a lap weld joint is thereby created between the insert surface 30 of the valve seat insert 22 and the exhaust valve seat surface 34 of the valve seat portion 36 using the weld beam 38 directed at the inner surface 42 and penetrating the outer end 28 from the inner surface 42 to the insert surface 30, thereby fusing the valve seat insert 22 to the valve seat portion 36.

The weld beam 38 generates minimal inclusions and minimizes porosity in a weld zone between the insert surface 30 of the valve seat insert 22 and the exhaust valve seat surface 34. According to several aspects, the weld beam 38 may be generated by a diode laser as noted above, a carbon dioxide ($CO_2$) laser, a fiber laser, or any laser having a predetermined power to fully penetrate the outer end 28 and to generate the fusion bond with the cylinder head exhaust valve seat portion 36.

Referring to FIG. 4 and again to FIGS. 2 and 3, after the weld beam 38 has traversed the inner surface 42, one or more surfaces such as an exhaust valve seating surface 44, a valve seat entrance surface 46, and an entrance surface 48 may be machined into the valve seat insert 22. After machining a maximum thickness 50 of the outer end 28 is less than 3.0 mm and may range from preferably approximately 0.5 mm up to approximately 2.0 mm.

Referring to FIG. 5 and again to FIGS. 1 through 4, a system and method to attach valve seat inserts to an aluminum cylinder head 52 is modified from the system and method to attach valve seat inserts to an aluminum cylinder head 10 and provides an aluminum cylinder head 54 having a raised portion 56. An exhaust valve seat insert 58 is positioned in a cavity 60 of the raised portion 56. The exhaust valve seat insert 58 has an initial thickness 62.

Referring to FIG. 6 and again to FIGS. 2 through 5, the weld beam 38 is displaced in a weld direction 64 along an exposed surface 66 of the exhaust valve seat insert 58. As previously noted, the weld beam 38 is predetermined in intensity and power to penetrate and melt the exhaust valve seat insert 58 and to create a fusion bond 68 defining a lap weld joint along an entire boundary between the exhaust valve seat insert 58 and an exhaust valve seat surface of the cavity 60, thereby fusing the exhaust valve seat insert 58 to the raised portion 56 of the aluminum cylinder head 54.

Figure 5:
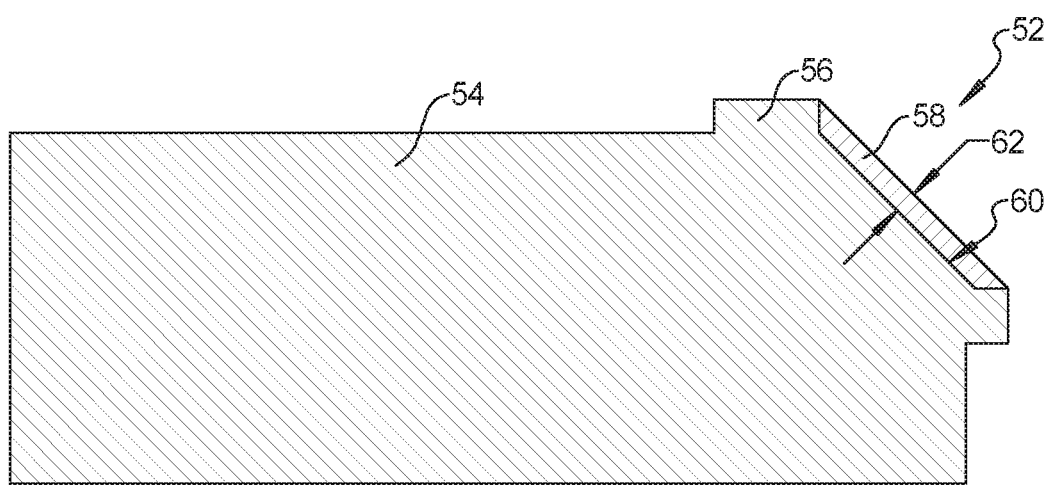
FIG. 5 is a cross-sectional view similar to FIG. 3 of another aspect of a valve seat insert prior to welding.
Figure 6:
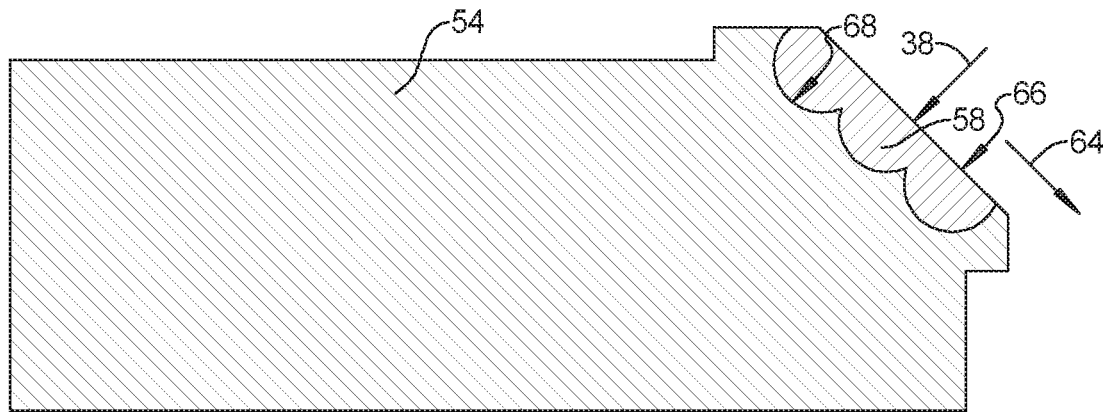
FIG. 6 is a cross-sectional view of the valve seat insert of FIG. 5 during welding.
Figure 7:
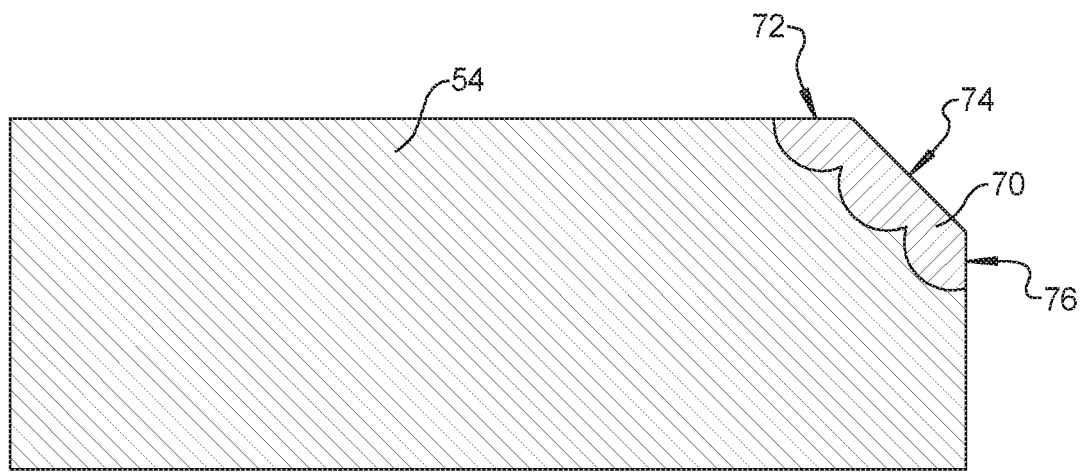
FIG. 7 is a cross-sectional view of the valve seat insert of FIG. 6 following machining.

Referring to FIG. 7 and again to FIGS. 5 through 6, after completion of the weld beam 38 passage and formation of the fusion bond 68 an exhaust valve seat 70 is completed by machining predetermined surfaces onto the exhaust valve seat insert 58. These surfaces may include a relief surface 72, an exhaust valve seating surface 74 and a valve stem entrance bore surface 76.

A system and method to attach valve seat inserts to an aluminum cylinder head of the present disclosure eliminates the contact surface gap between a copper alloy valve seat insert and an aluminum head by lap welding the valve seat insert to the aluminum head. Engine valve seat operation temperatures are reduced by approximately 20 degrees C. by formation of a weld zone which eliminates contact surface gaps between the valve seat insert and the aluminum head. The present valve seat design and installation process also eliminates pores and cracks caused by use of a laser clad process and material in known valve seat installation.

A system and method to attach valve seat inserts to an aluminum cylinder head of the present disclosure offers several advantages. These include a method to attach valve seat inserts to aluminum alloy cylinder heads. A pre-formed, thin wall copper insert is attached to the aluminum alloy head by precision lap joining and forms a metallurgical bond at a copper and aluminum interface.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to attach valve seat inserts to an aluminum cylinder head of an automobile vehicle using a lap weld joint, comprising:
   forming a valve seat portion with a valve seat surface into a cylinder head of an automobile vehicle engine;
   positioning a valve seat insert in the valve seat portion of the cylinder head, the valve seat insert having an outer end including an insert surface and an inner surface oppositely facing with respect to the insert surface;
   machining an outer end of a body of the valve seat insert to create an insert surface for a total width of the body;
   applying a welding beam to the inner surface of the valve seat insert, the welding beam penetrating the outer end from the inner surface to the insert surface to create a fusion bond defining a lap weld joint between the valve seat insert and the valve seat portion, thereby fusing the valve seat insert to the valve seat portion; and
   machining multiple surfaces including a valve seating surface, a valve stem entrance bore surface, and an entrance surface into the outer end after completion of the application of the welding beam.

2. The method of claim 1, wherein the valve seat insert is formed of pure copper.

3. The method of claim 1, wherein the valve seat insert is formed from a powdered metal having 60% to 84% copper, 5% to 25% nickel, 5% to 20% aluminum, 5% to 10% manganese, up to 0.35% Nb and 1% to 5% by volume $Al_2O_3$.

4. The method of claim 1, further including machining the outer end to provide a thickness of the outer end of approximately 1 mm after completion of the application of the welding beam.

5. The method of claim 1, further including forming the valve seat insert from a copper alloy having 70% to 85% copper, 10% to 20% aluminum, and 5% to 20% nickel.

6. The method of claim 1, further including selecting a diode laser having a wavelength of 450 nm to 1050 nm for the application of the welding beam.

7. The method of claim 1, further including:
   providing the cylinder head as an aluminum cylinder head;
   creating a raised portion in the valve seat portion of the aluminum cylinder head; and
   locating the valve seat insert in a cavity of the raised portion during positioning of the valve seat insert.

8. A method to attach valve seat inserts to an aluminum cylinder head of an automobile vehicle using a lap weld joint, comprising:
   forming an exhaust valve seat portion into an aluminum cylinder head of an automobile vehicle engine;
   producing an exhaust valve seat insert of a copper or a copper alloy material;
   positioning the exhaust valve seat insert in the exhaust valve seat portion of the aluminum cylinder head;
   performing a laser welding operation along an outer surface of the exhaust valve seat insert to create a fusion bond defining a lap weld joint between the exhaust valve seat insert and the exhaust valve seat portion, thereby fusing the exhaust valve seat insert to the exhaust valve seat portion; and
   machining an outer end of the exhaust valve seat insert to provide a thickness of the outer end of approximately 1 mm after completion of the laser welding operation.

9. The method of claim 8, further including machining an outer end of a body of the exhaust valve seat insert to create an insert surface for a total width of the body prior to performing the laser welding operation.

10. The method of claim 9, further including machining the outer end to provide a thickness of the outer end of approximately 1 mm after completion of the laser welding operation.

* * * * *